(No Model.)
C. A. CHANDLER.
FAUCET SOCKET.
No. 321,639. Patented July 7, 1885.
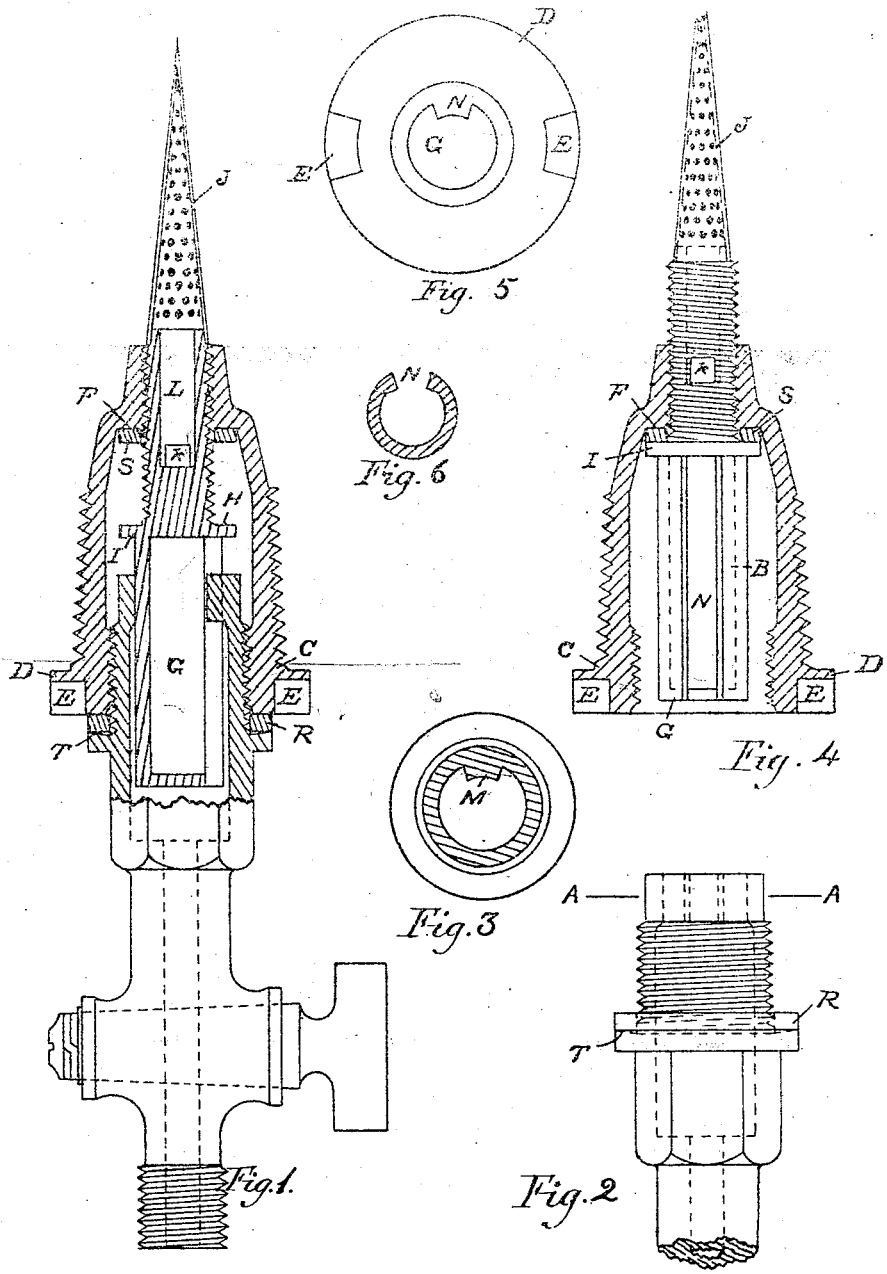
Witnesses,
Francis E. Gallespe.
P. R. Bradley
Inventor
Clarence A. Chandler

UNITED STATES PATENT OFFICE.

CLARENCE A. CHANDLER, OF EAST BRIDGEWATER, MASSACHUSETTS.

FAUCET-SOCKET.

SPECIFICATION forming part of Letters Patent No. 321,689, dated July 7, 1885

Application filed April 2, 1885. (No model.)

*To all whom it may concern:*

Be it known that I, CLARENCE A. CHANDLER, a citizen of the United States, residing at East Bridgewater, in the county of Plymouth and State of Massachusetts, have invented a new and useful Improvement in Faucet-Sockets, of which the following is a specification.

My invention is designed to be used in connection with barrels or other receptacles from which liquids are drawn through faucets.

The objects of my invention are, first, to make a faucet-socket which can be easily and strongly attached to a barrel or other receptacle from without, and which can be made either so perfectly tight as to prevent the escape of any liquid, or by a simple adjustment to form an open passage through which liquid may freely escape; second, to make a faucet-socket which will securely hold a faucet, and which will, by the act of inserting the faucet, be adjusted to form an unobstructed passage through it, and which will be firmly closed by the act of withdrawing the faucet; third, to make a faucet-socket which can be easily cleaned or repaired and only opened by a special key.

I attain these objects by instrumentalities represented in the accompanying drawings, forming a part of this specification, in which—

Figure 1 is a longitudinal section of socket with its valve, washers, and the end of the faucet in the relative positions they occupy when the faucet is atached. Fig. 2 represents that end of the faucet which is designed to enter the socket. Fig. 3 represents a section of the end of the faucet through A A. Fig. 4 represents a longitudinal section of socket, showing the plug or valve in the position it occupies when the passage through the socket is closed. Fig. 5 represents an end view of socket and valve. Fig. 6 represents a section of the valve-stem through B.

Similar letters refer to similar parts throughout the several views.

The shell C of the socket is externally screw-threaded for the purpose of securing it to the receptacle. It has an enlarged portion or head, D, having two or more recesses, E E, designed to engage with a wrench or key. Internally this shell is chambered, and has a shoulder, F, at one end. There is a tapped hole extending to the chamber from each end of the shell. One of these holes has a right-handed thread and the other a left-handed thread. The plug or valve G is externally screw-threaded to fit the tapped hole at the shouldered end of the shell C. It also has a shoulder, H, formed by the head I. The threaded end of this plug or valve has a strainer, J. The ports K K, which extend transversely through the threaded portion of the valve, communicate with the interior of the strainer by means of the lateral port L. The portion of the plug or valve which is unthreaded, and which I term the "valve-stem," is cylindrical and hollow. A slit or spline, N, extends the entire length of this stem (from the head I to its end) and communicates with its hollow interior. The end of the faucet designed to enter the socket (see Fig. 2) is internally chambered to admit the valve-stem, and is provided with a lug, M, designed to engage in the spline N. This end of the faucet, with the exception of a small portion at the tip, is screw-threaded externally to fit the tappet-hole opposite the shoulder end of the socket C. The unthreaded tip is to insure the entrance of the lug M in the spline N at the time the threads of the faucet are entering those of the shell C. Beyond the threaded portion of the faucet end there is a shoulder, T, with a slightly-concave surface.

R and S represent washers.

The operation of my invention is as follows: The shell having been screwed into the barrel or other receptacle and the valve or plug screwed into the position shown in Fig. 4, the passage through the socket is completely closed. The washer S, being pressed between the shoulders F of the shell and H of the plug, insures a perfect joint. When the end of the faucet is inserted in the shell C, the short unthreaded portion on the extreme end overlaps the valve-stem sufficiently to insure the entrance of the lug M into the spline N. The faucet is then screwed into the shell C until the washer R bears firmly against the head D. The lug M being in the spline N causes the plug or valve G to revolve with the faucet as the faucet is being screwed into the shell C. Therefore the valve or plug, which has a screw-thread with a pitch opposite to that of the faucet, is caused to move toward the faucet as the latter is being screwed into the shell C. In this operation the valve-stem slides into the chambered end of the faucet, and the ports K K withdraw beyond the shoulder F, thus opening a free passage through the socket, as shown in Fig. 1. There are a sufficient number of threads between the ports K K and the shoulder H to prevent the device from leaking while the faucet is being screwed into the socket. The act of unscrewing the faucet reverses the above-described operation. It screws the plug or valve back into the position shown in Fig. 4, thus closing the passage through the socket. There is no hole visible in the exposed end of the valve-stem, into which a square plug or other instrument can be inserted for the purpose of operating the valve, and only one side of the stem is recessed or splined, which prevents the use of two-pronged or ordinary instruments for the purpose of operating it.

Having described my invention, I claim—

1. The bushing or shell externally threaded and shouldered for engagement with a cask, and provided with an internal chamber and with oppositely-threaded sockets at the opposite ends of said chamber, combined with the plug or valve adapted to be screwed into the inner socket of the shell, and having ports which are covered by the inner socket when the valve is screwed to place and uncovered when the valve is partly unscrewed, and a stem projecting outwardly into the chamber in the socket and containing a longitudinal slot or spline in one side, as set forth.

2. The combination of the bushing or shell externally threaded or shouldered for engagement with a cask, and provided with an internal chamber and with threaded sockets at the opposite ends of said chamber, said sockets being oppositely threaded, as described, the plug or valve adapted to be screwed into the inner socket of the shell, and having ports which are covered by the inner socket when the valve is screwed to place, and a stem projecting outwardly into the chamber and provided at one side with a longitudinal slot or spline, N, and the faucet externally screw-threaded to be screwed into the outer socket in the shell and provided at its inner end with an internal lug, M, formed to engage with the slot or spline in the stem of the valve, the arrangement being such that the rotation of the faucet in one direction while it is engaged with the shell and slotted valve-stem will cause the simultaneous inward movement of the faucet and outward movement of the valve, and vice versa, the lug of the faucet sliding in the slot or spline of the valve-stem when the faucet and valve are in motion, as set forth.

CLARENCE A. CHANDLER.

Witnesses:
FRANK G. PARKER,
CHAS. SPAULDING.